No. 890,442. PATENTED JUNE 9, 1908.
I. NIELSEN.
SAFETY PIN ATTACHMENT.
APPLICATION FILED NOV. 9, 1907.
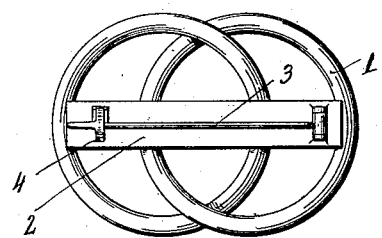
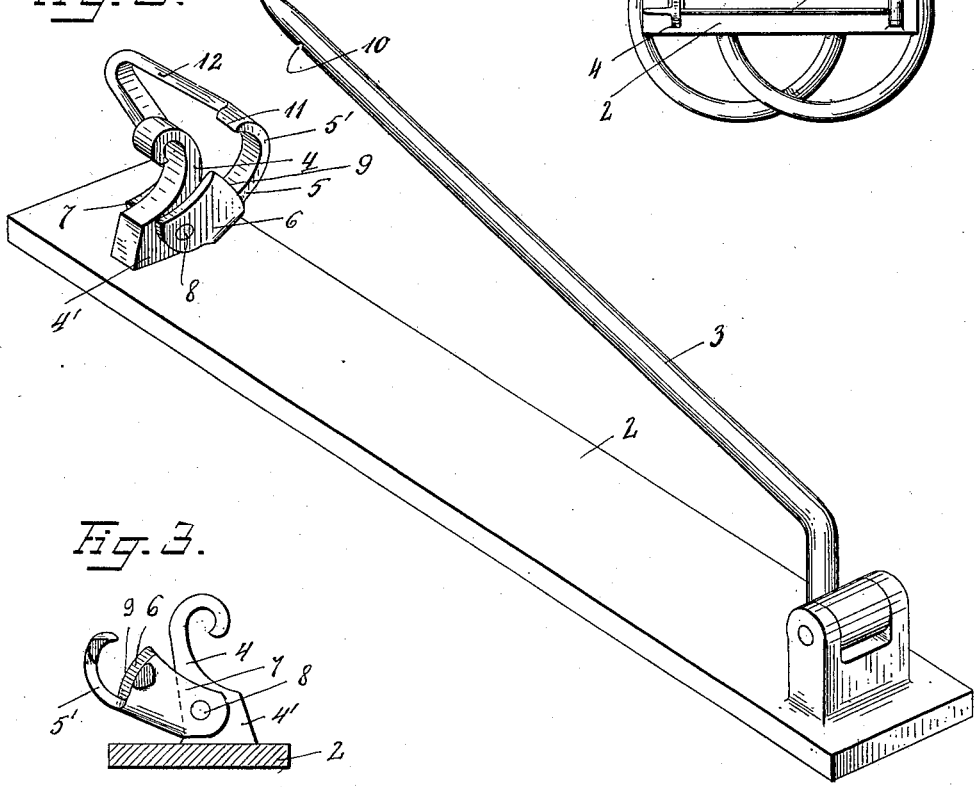
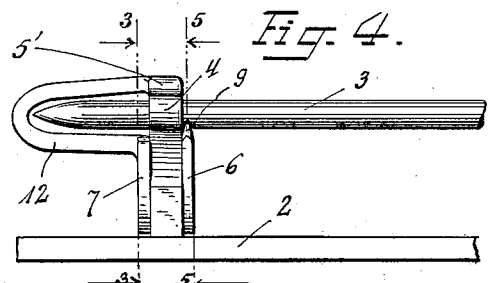
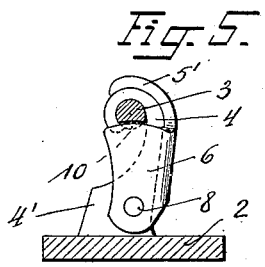
Inventor
Ivar Nielsen
By his Attorney

UNITED STATES PATENT OFFICE.

IVER NIELSEN, OF NEW ROCHELLE, NEW YORK, ASSIGNOR TO FREDERICK W. HOYT, OF NORWALK, CONNECTICUT, AND FREDERICK C. GEIGER, OF EAST ORANGE, NEW JERSEY.

SAFETY-PIN ATTACHMENT.

No. 890,442.  Specification of Letters Patent.  Patented June 9, 1908.

Application filed November 9, 1907. Serial No. 401,399.

*To all whom it may concern:*

Be it known that I, IVER NIELSEN, a subject of the King of Norway, and a resident of New Rochelle, county of Westchester, State of New York, have invented certain new and useful Improvements in Safety-Pin Attachments, of which the following is a specification.

The present invention pertains to safety pin attachments for jewelry articles as brooches, or the like, and has for its object to provide means for preventing the accidental opening of the safety pin and also means for protecting the point of the pin to prevent it from injuring the wearer.

To make my invention more clear the same is illustrated in the accompanying drawing in which Figure 1, by way of example, shows a brooch equipped with the improved safety pin; Fig. 2 is a perspective view of the improved safety pin in enlarged scale; Fig. 3 is a cross section on line 3—3 of Fig. 4; Fig. 4 is a side elevation of the safety pin, a part thereof being broken away, and Fig. 5 is a cross section on line 5—5 of Fig. 4.

With reference to the drawings, 1 designates a jewelry article, as a brooch, the back of which is provided with a safety pin which consists of a plate 2, swinging pin 3 and hook 4.

My invention consists in providing an attachment to the hook 4, which, after the pin is closed by engagement with said hook, can be swung so as to grasp the hook and pin to render accidental disengagements thereof impossible, and, at the same time, to form a shield around the point of the pin preventing it from doing any injury when handling the article.

The attachment consists of a hook shaped spring 5 the lower portion of which is provided with side flanges 6, 7 embracing the base 4' of the hook 4 and pivoted thereto at 8, to be capable of swinging to and fro. One of said side flanges, as 6, is extended beyond the upper edge of the other side flange 7 (with reference to Figs. 2—5) and is formed with a wedge shaped slightly curved edge 9 which in closed position of the pin and of the auxiliary hook body 5 will engage a correspondingly shaped notch 10 in the pin 3. The spring 5 is curved to conform with the shape of the hook 4, so as to in closed position intimately embrace the latter. In swinging the spring 5 towards the hook 4, and by the exertion of a slight pressure thereon the edge 11 of the hook 5' will be forced over the highest point of the hook 4, and, under its spring action, snap around the front portion of the hook 4 to become firmly engaged therewith.

Suitably secured at one end to the hook portion 5' of the spring 5 and at the other to the outer flange 7 thereof, or made integrally therewith, is a laterally projecting bow 12 which, in closed position of the pin and of the spring 5, will embrace the outwardly projecting pointed portion of the pin, and thus prevent the same from injuring the one handling the article. At the same time this bow serves as a handle for the manipulation of the swinging spring 5.

After the pin is closed by engagement with hook 4, the body 5 is swung toward and caused to firmly engage the hook 4. Simultaneously therewith the wedge shaped edge of the inner flange 6 will engage notch 9 in the pin, and the bow 12 will longitudinally embrace the outwardly projecting end of the pin.

What I claim and desire to secure by Letters Patent is:

1. In a safety pin attachment, the combination with the hinged pin and the rigid hook, of an auxiliary spring hook pivoted to the rigid hook and adapted to engage around the latter and to be locked therewith, and a flange or shoulder on said spring hook to engage the exposed side of the pin and to lock it in the rigid hook.

2. In a safety pin attachment, the combination with the hinged pin, having a notch at its pointed end, and the rigid hook, of a spring hook pivoted to said rigid hook, a shoulder formed on said pivoted hook and adapted to engage the said notch to lock the exposed side of the pin, and a bow extending laterally from said hook and longitudinally with the pin to embrace the pointed end of the latter when locked.

Signed at New York this 23d day of October, 1907.

IVER NIELSEN.

Witnesses:
ROBERT STRAHL,
MAX D. ORDMANN.